(12) United States Patent
Tawa et al.

(10) Patent No.: US 6,302,749 B1
(45) Date of Patent: Oct. 16, 2001

(54) OUTBOARD MOTOR

(75) Inventors: Hiroki Tawa; Nobuo Haga, both of Wako (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 0 days.

(21) Appl. No.: 09/232,471

(22) Filed: Jan. 15, 1999

(30) Foreign Application Priority Data

Jan. 19, 1998 (JP) .................................................. 10-008120

(51) Int. Cl.$^7$ ..................................................... B63H 20/32

(52) U.S. Cl. ................................................................ 440/76

(58) Field of Search .................................. 440/76, 77, 88; 123/195 P

(56) References Cited

U.S. PATENT DOCUMENTS

| | | | |
|---|---|---|---|
| 4,874,959 | * 10/1989 | Sheridan | 290/1 B |
| 5,370,563 | * 12/1994 | Yamazkai et al. | 440/77 |
| 5,445,547 | * 8/1995 | Furukawa | 440/77 |
| 5,503,577 | * 4/1996 | Ming et al. | 440/76 |
| 5,921,827 | * 7/1999 | Ichihashi | 440/77 |

FOREIGN PATENT DOCUMENTS 6-33790  2/1994  (JP) .

* cited by examiner

*Primary Examiner*—S. Joseph Morano
*Assistant Examiner*—Andy Wright
(74) *Attorney, Agent, or Firm*—Adams & Wilks

(57) ABSTRACT

An outboard motor has a first case member and a second case member connected to the first case member to form an enclosure having an inner space in which is mounted an engine. The first case member has an air intake hole for taking air into the inner space and a vent hole for exhausting the air after it circulates in the inner space to cool the interior of the inner space. An alternator is disposed in the inner space of the enclosure and has a hollow casing, air passage holes formed in the hollow casing, and cooling fans for drawing air from the air passage holes into the hollow casing to cool the alternator. A cover member is disposed in the inner space of the enclosure and covers at least a portion of the alternator. The cover member has a vent hole communicating with the vent hole of the first case member, an upper wall, a side wall extending from the upper wall and surrounding the portion of the alternator, and air passage holes formed in the side wall for introducing air therethrough into the cover member and through the air passage holes of the alternator hollow casing to cool the alternator before the air is discharged from the vent hole of the cover member. An electric equipment box is disposed in the engine room at a position intermediate the air intake hole of the engine cover and the alternator.

14 Claims, 10 Drawing Sheets

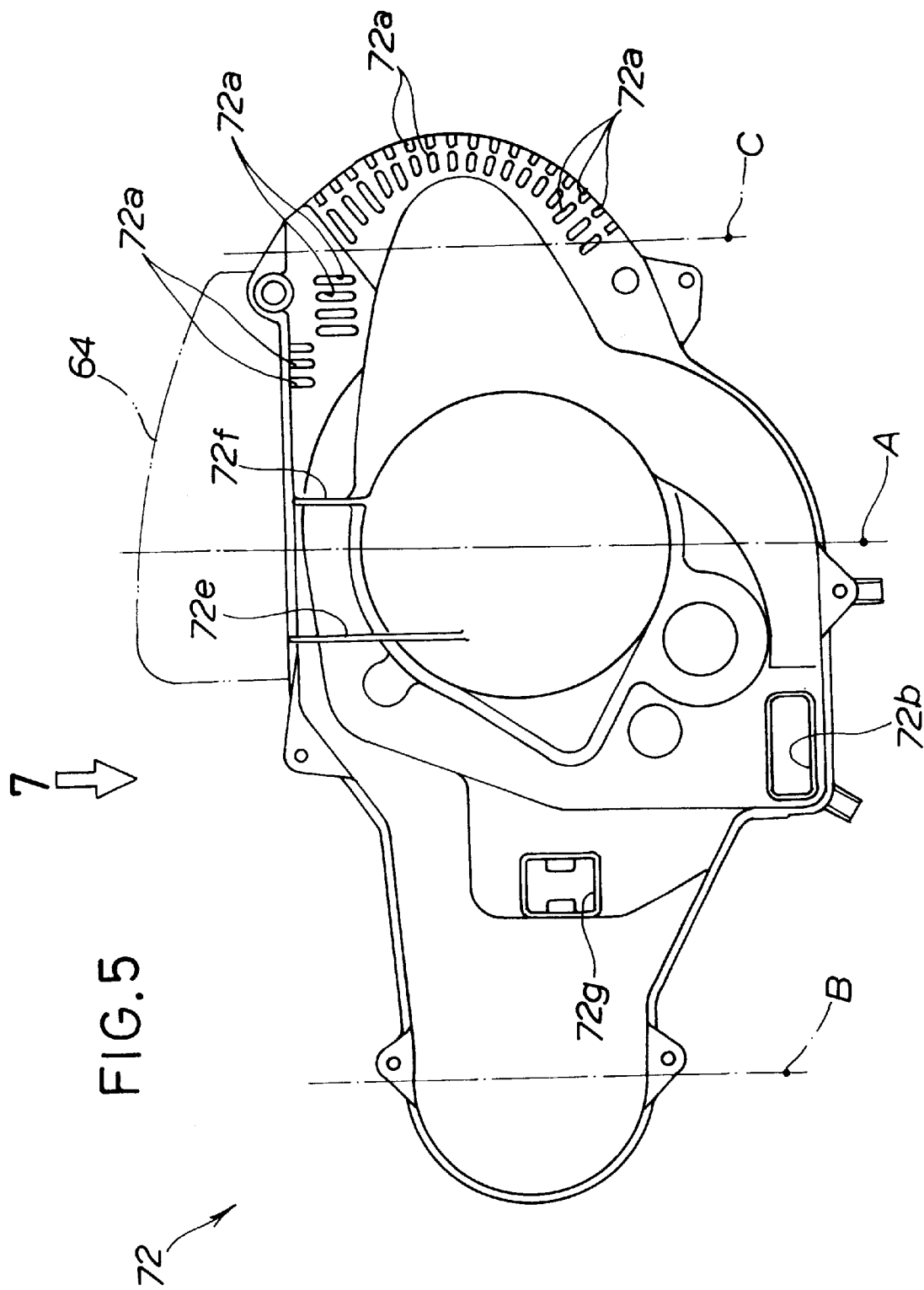

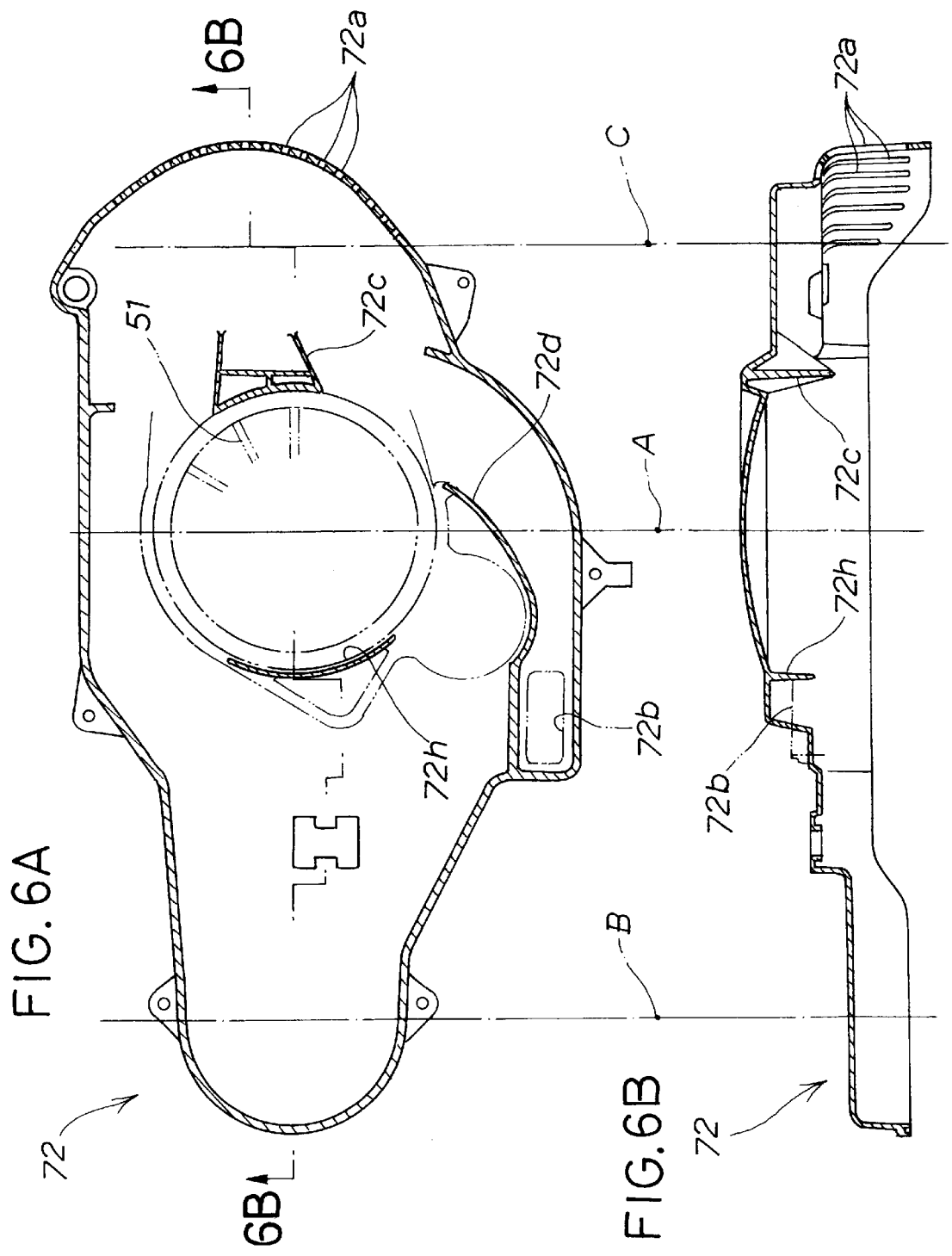

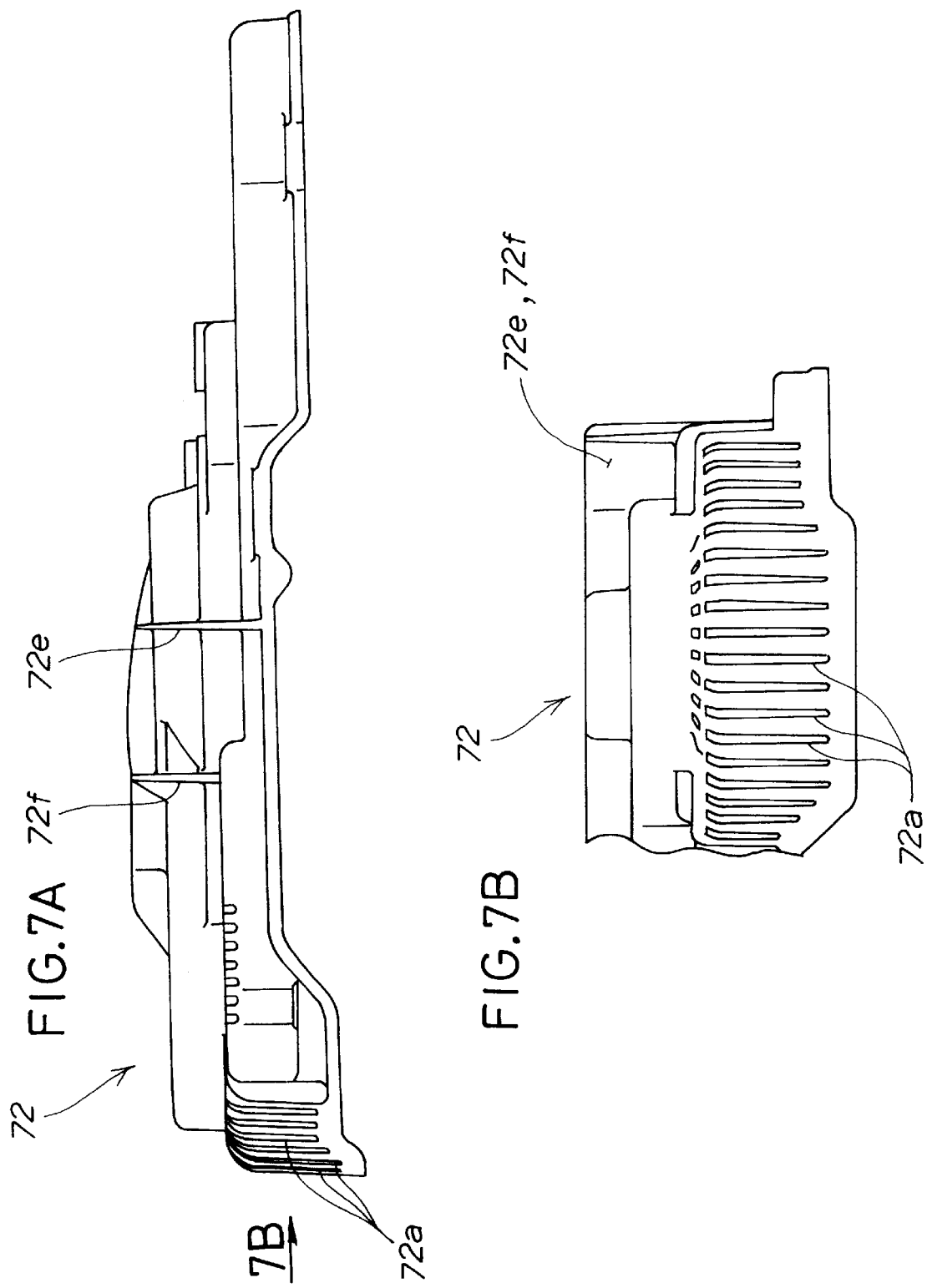

OUTBOARD MOTOR

BACKGROUND OF THE INVENTION

1. Field of the Invention

The present invention relates to an outboard motor having an alternator belt-driven by a vertical engine received in an engine room covered by an engine cover.

2. Description of the Prior Art

Outboard motors generally have a vertical engine received in an engine room covered by a water-proof engine cover. The engine cover has a fresh air intake hole for taking fresh air into the engine room. The fresh air taken into the engine room is fed into an air intake device connected to each combustion chamber of the engine. The vertical engine includes a pulley mounted to the upper end of a crankshaft for driving an alternator via an endless belt trained around the pulley and a driven pulley mounted on the alternator. The pulleys and the endless belt are covered by the engine cover.

One example of the outboard motors is disclosed, for example, in Japanese Patent Laid-open Publication No. 6-33790 entitled "Ship Propulsive Machine". The disclosed ship propulsive machine has a top cowl in which an engine body is received. The top cowl is formed with a fresh air intake hole at which fresh air is taken into an engine room. The fresh air taken into the engine room is drawn into the engine body through an air inlet. An alternator is disposed at a position offset from a path along which the fresh air flows from the fresh air intake hole to the air inlet. The alternator is covered by a water-proof cover only at an upper portion thereof.

In the ship propulsive machine, however, since no consideration is given to exhausting of the stale air from the alternator, effective cooling of the alternator is difficult to achieve. Furthermore, due to hot air tending to fill up the top cowl without venting, the atmospheric temperature inside the engine room readily goes up and thus raises the intake air temperature of the engine. This may form a strong obstruct to the increase of the engine power output.

SUMMARY OF THE INVENTION

With the foregoing problem in view, it is a first object of the present invention to provide an outboard motor which is capable of controlling the flow of air in the vicinity of an alternator to enable effective cooling of the alternator.

A second object of the present invention is to provide an outboard motor which can perform effective ventilation of a belt cover.

To attain the foregoing object, an outboard motor according to the present invention comprises an engine cover defining an engine room and having an air intake hole for taking fresh air into the engine room, an engine block having a crankshaft rotatably supported in a vertical position within the engine room, a drive pulley mounted to an upper end portion of the crankshaft, an alternator having a driven pulley connected in driven relation to the drive pulley via an endless belt extending around the drive and driven pulleys, and a belt cover covering the drive and driven pulleys, the endless belt and at least an upper portion of the alternator. The alternator has a plurality of cooling fans for taking the fresh air into the interior of the alternator to cool the alternator. The belt cover has a multiplicity of air passage holes formed in an upper portion extending around the alternator.

The alternator is continuously driven by the engine while the engine is running. During that time, the cooling fans of the alternator rotate continuously. The fresh air taken from the fresh air intake hole into the engine (namely, the outside air having a temperature lower than that of the air inside the engine room) is caused by the cooling fans to flow through the multiplicity of air passage holes into the belt cover to cool the alternator.

The outboard motor may further include a ventilating fan mounted to the upper end portion of the crankshaft for ventilating the interior of the belt cover, a vent hole formed in the belt cover for discharging the fresh air from the engine room to the outside of the outboard motor after the fresh air is engaged in the cooling of the alternator, and at least one guide wall provided inside the belt cover at a position between the drive pulley and the driven pulley for guiding the fresh air toward the vent hole in such a way to bypass the endless belt as the fresh air is discharged from the engine room.

In the belt cover, two air flows are produced one by a ventilating action of the ventilating fan and the other by drawing and discharging actions of the cooling fans. The second-mentioned air flow is more intensive than the first-mentioned air flow. However, by virtue of the guide wall, no direct influence is exerted from the second-mentioned air flow (produced by the cooling fans) on the first-mentioned air flow (produced by the ventilating fan). The thus controlled two air flows can be smoothly discharged from the engine room, so that the interior of the belt cover is sufficiently ventilated.

The above and other object, features and advantages of the present invention will become manifest to those versed in the art upon making reference to the detailed description and accompanying sheets of drawings in which a preferred structural embodiment incorporating the principles of the present invention is shown by way of illustrative example.

Figure 3:
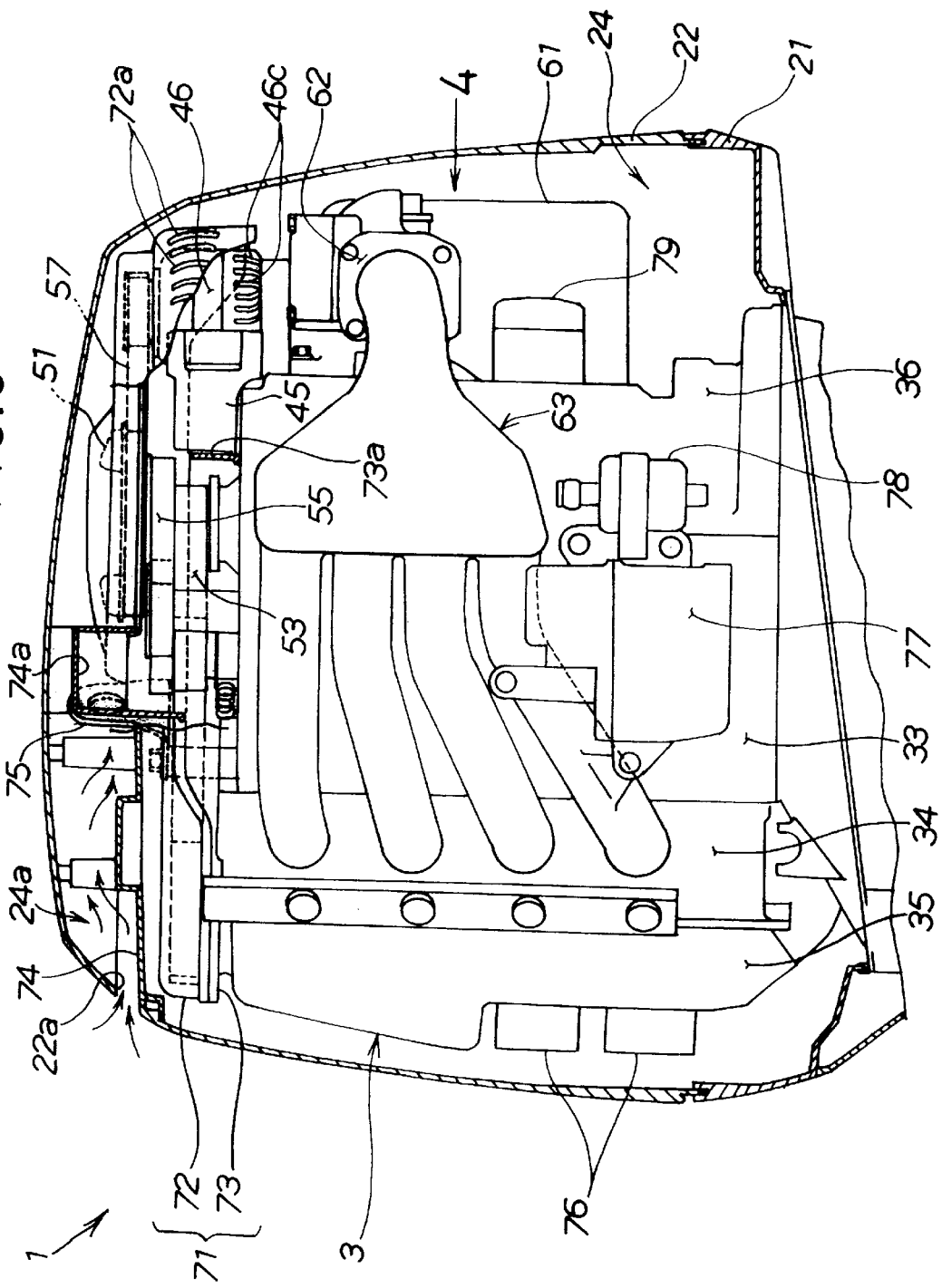
FIG. 3 is a view in the direction of arrow 3 in FIG. 2.
Figure 8A:
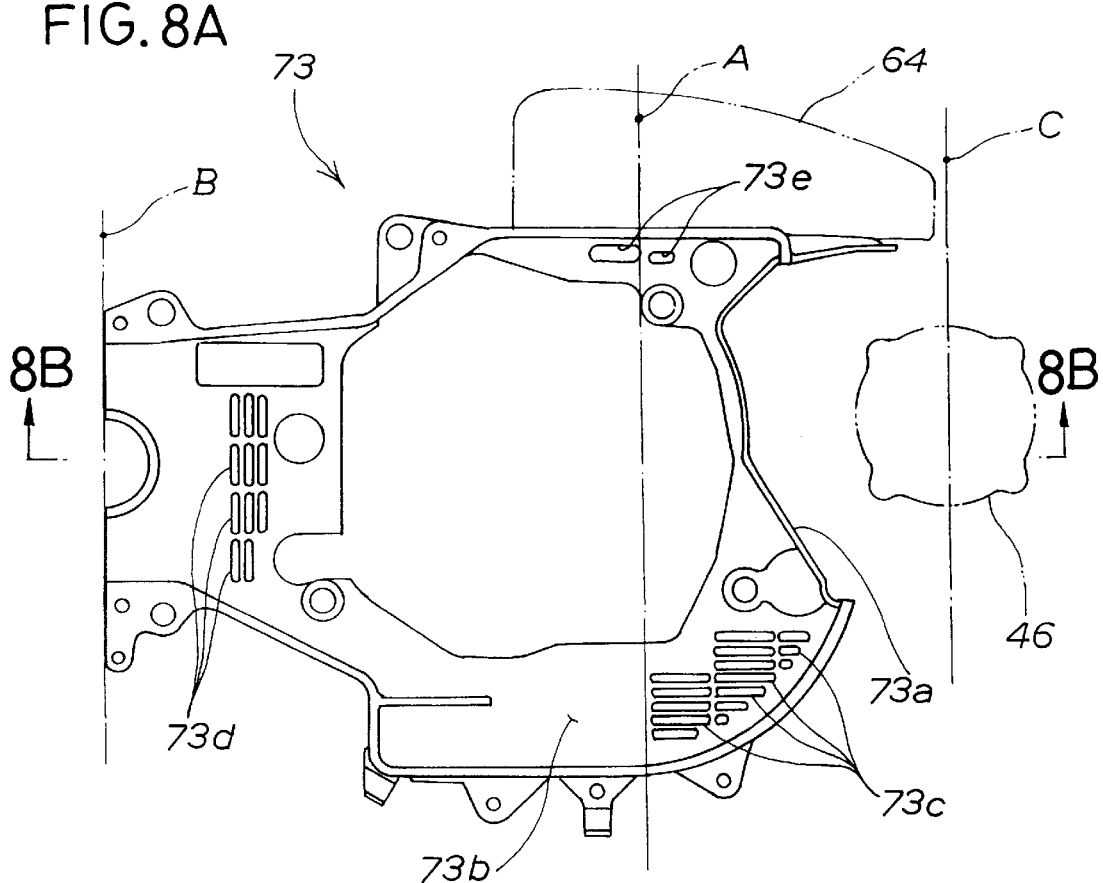
Figure 8B:
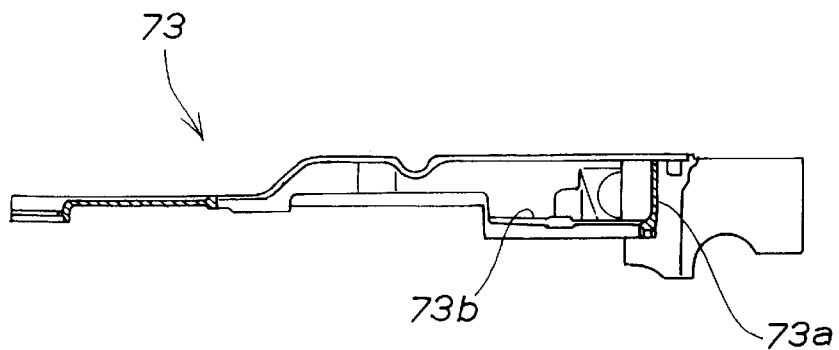
Figure 9:
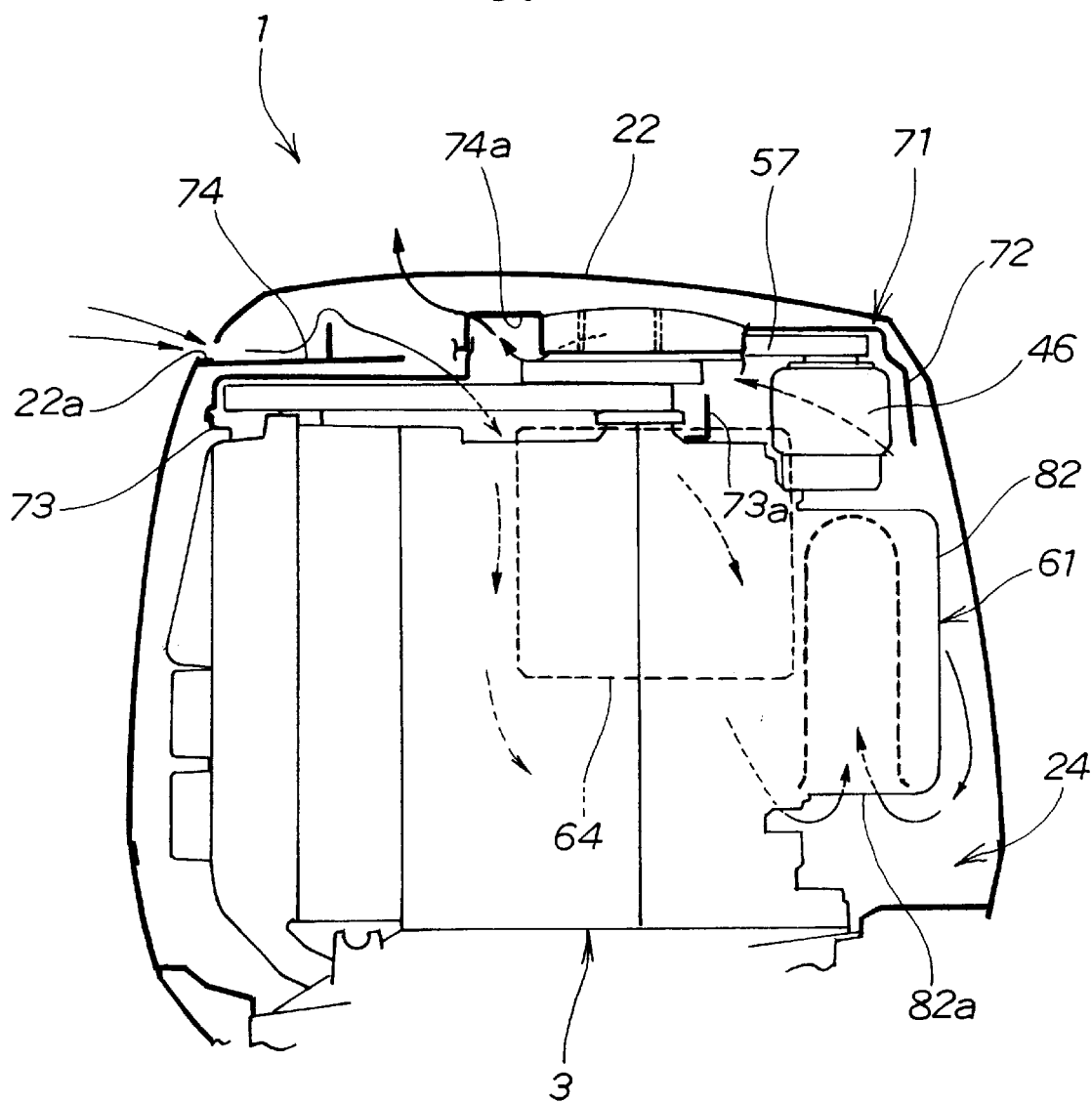
Figure 10:
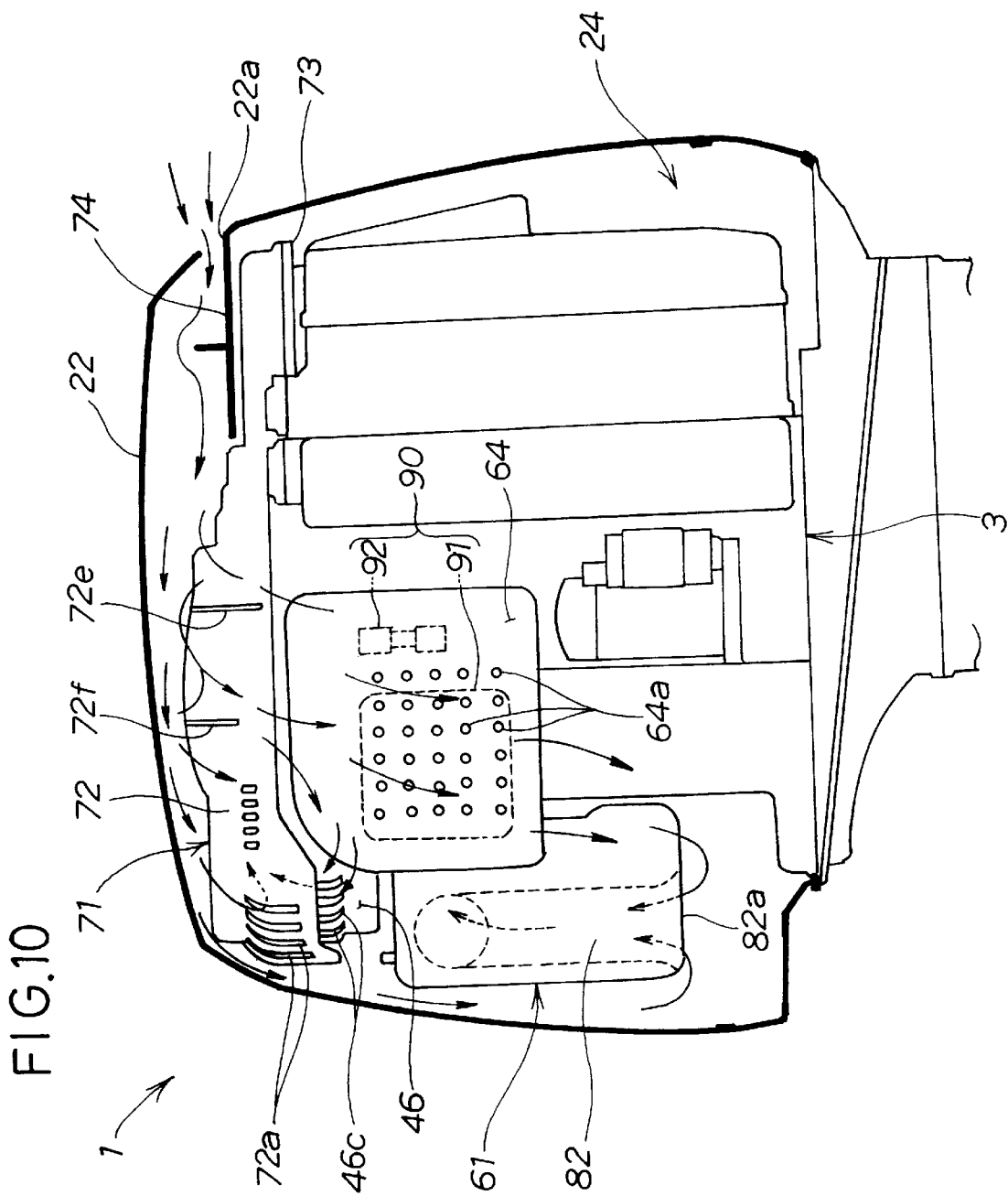

FIG. is a view in the direction of arrow 4 in FIG. 3;

FIG. 5 is a plan view of an upper cover member of a belt cover shown in FIG. 3;

FIG. 6A is a cross-sectional view of the upper cover member shown in FIG. 5;

FIG. 6B is a cross-sectional view taken along line 6B—6B of FIG. 6A;

FIG. 7A is a front elevational view of the upper cover member shown in FIG. 5A;

FIG. 7B is a side view in the direction of arrow 7B in FIG. 7A;

FIG. 8A is a plan view of a lower cover member of the belt cover shown in FIG. 3;

FIG. 8B is a cross-sectional view taken along line 8B—8B of FIG. 8A;

FIG. 9 is a diagrammatical view showing a first cooling operation of the outboard motor of the present invention; and FIG. 10 is a diagrammatical view showing a second cooling operation of the outboard motor of the present invention.

DETAILED DESCRIPTION OF THE PREFERRED EMBODIMENT

One preferred structural embodiment of the present invention will be described below in greater detail with reference to the accompanying sheets of drawings.

Figure 1:
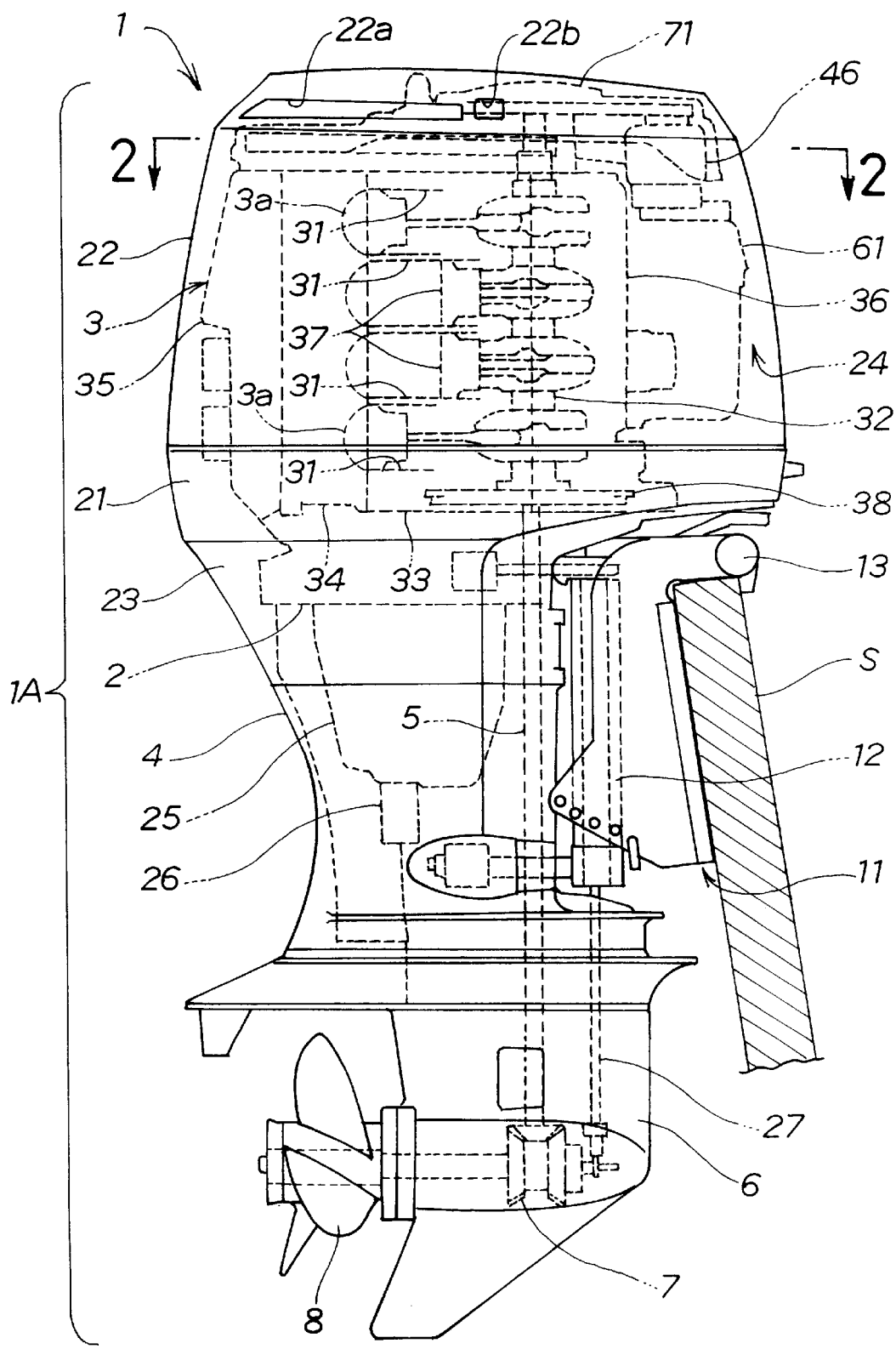
FIG. 1 is a side view of an outboard motor according to the present invention.

Referring now to FIG. 1, there is shown an outboard engine or motor 1 embodying the present invention. The outboard motor includes an outboard motor body 1a which comprises a mount case 2 serving as an engine mount member, a vertical multicylinder engine 3 carried on and bolted to the mount case 2, an extension case 4 bolted to the bottom of the mount case 2 and defining therein an exhaust expansion chamber, a vertical drive shaft 5 extending vertically through an internal space of the extension case 4 for transmitting rotational power of the engine 3 to a propeller 8, a gear case 6 connected to a lower end of the extension case 4, and a bevel gear set 7 received in the gear case 6 and operatively connected to a dog clutch (not designated) for switching or changing over the forward and reverse rotation of the propeller 8 to move a hull S forwards and backwards, the bevel gear set 7 having an output shaft to which the propeller 8 is firmly connected so that the propeller 8 is rotatably driven by the engine power transmitted via the vertical drive shaft 5. The outboard motor body 1a is attached to a stern of the hull S by an outboard motor attachment mechanism 11 with a mount rubber (not shown) disposed between the attachment mechanism 11 and the stern of the hull S.

Throughout the specification, the terms "front" and "rear" are used with reference to the direction of movement of the hull S on which the outboard motor 1 of the present invention is mounted.

The outboard motor attachment mechanism 11 is a fixture assembly used for securing the outboard motor body 1a to the stern of the hull S. The attachment mechanism 11 supports the motor body 1a such that the motor body 1a can swing in the lateral direction about a vertical swivel shaft 12 and it also able to tilt up and down about a horizontal tilt shaft 13.

The outboard motor body 1a further has an under case 21 for receiving therein the engine 3, an engine cover 22 mounted on the top of the under case 21, and an under cover 23 disposed directly below the under case 21 and surrounding the mount case 2 and an upper end portion of the extension case 4.

More particularly, the under case 21 is mounted on and bolted to an upper portion of the mount case 2. The under case 21 and the engine cover 22 mounted thereon are detachably connected by a lock mechanism (not shown). The under case 21 has a lower end connected by screws (not shown) to an upper end of the under cover 23.

The under case 21 and the engine cover 22 constitute first and second case member which jointly define an engine room in which the engine 3 is received. At an upper portion of its side wall, the engine cover 22 has a pair of laterally spaced fresh air intake openings 22a, 22a (FIG. 2) for taking fresh air (i.e., outside air having a temperature lower than that of the air inside the engine room 24) into the engine room 24, and a vent hole 22b for exhausting the air (hereinafter referred to as "stale air") after it circulates in the engine room 24 to cool the interior of the engine room 24. Thus, the engine room 24 can be ventilated. The fresh air intake holes 22a, 22a are in the form of horizontally elongated slits. The under cover 23 has the function of a decorative or ornamental cover.

The vertical multicylinder engine 3 is a four-cylinder four-stroke engine having four cylinders 31 arranged in vertical juxtaposition with their axes disposed horizontally and a crankshaft 32 disposed vertically. With the engine 3 thus arranged, a cylinder block 33 and a cylinder head 34 have respective contact surfaces lying substantially in a vertical plane. Similarly, the cylinder head 34 and a head cover 35 have respective contact surfaces lying substantially in a vertical plane. Combustion chambers 3a of the respective cylinders 31 of the engine 3 are formed in the contact surfaces of the cylinder block 33 and the cylinder head 34.

The engine 3 is disposed vertically with its cylinder head 34 and head cover 35 located at the rear side (left-hand side of FIG. 1) of the outboard motor 1 with respect to the hull S. In FIG. 1 reference numeral 26 denotes an oil pan; 26, an exhaust pipe; 27, shift rod; 36, a crankcase bolted to the cylinder block 33; 37, a piston received in each cylinder 31; and 38, a flywheel mounted on a lower end portion of the crankshaft 32.

Figure 2:
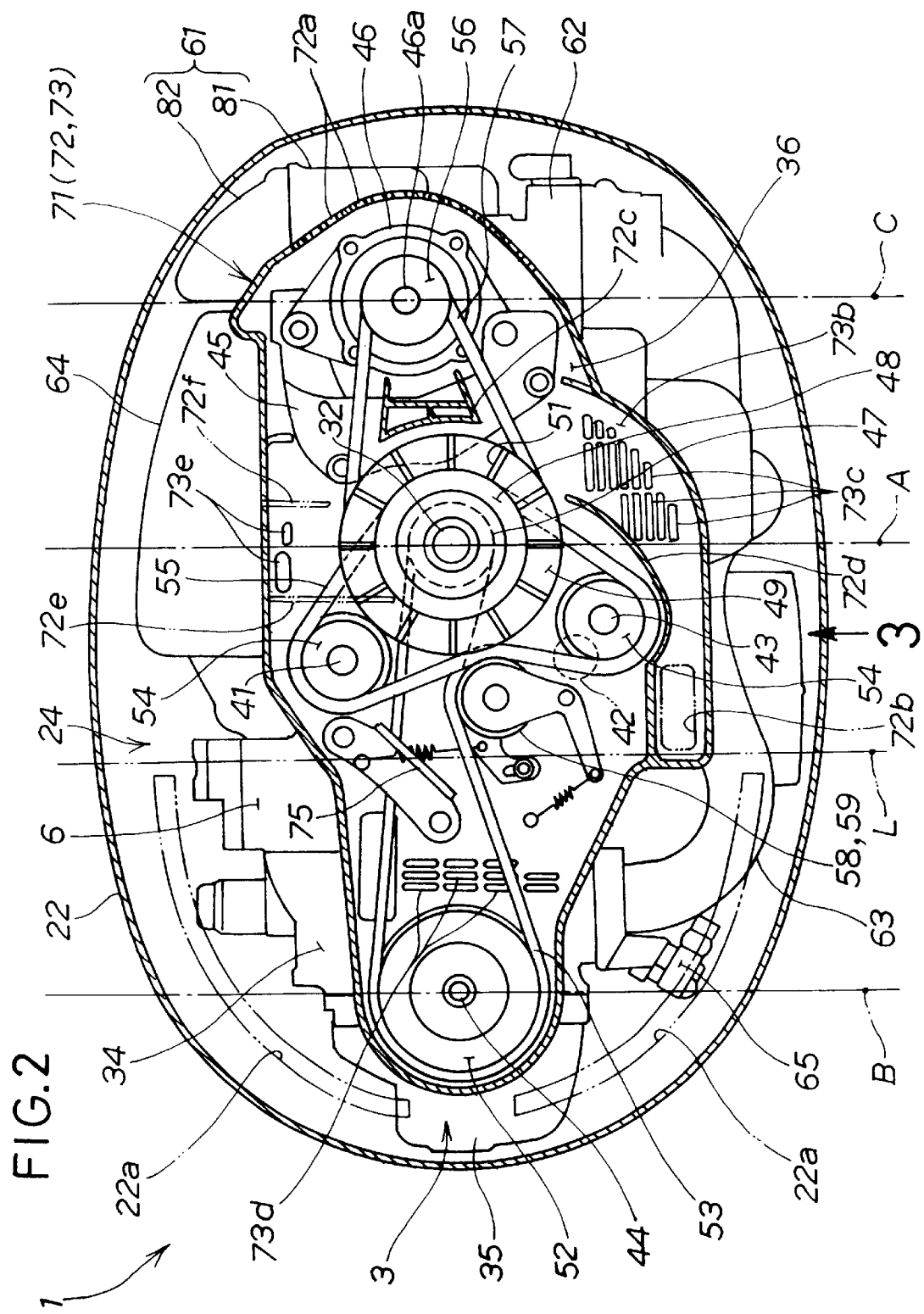
FIG. 2 is an enlarged cross-sectional view taken along line 2—2 of FIG. 1.

As shown in FIG. 2, the engine 3 has two balancer shafts 41, 42, an intermediate shaft 43 disposed adjacent to the balancer shaft 42, and a camshaft 44. These shafts 41, 42, 43, 44 are parallel to the crankshaft 32. An air-cooled alternator 46 (hereinafter referred to as "alternator" is mounted on an upper surface of the crankcase 36 via a bracket 45. The balancer shaft 42 and the intermediate shaft 43 are operatively interconnected with each other. The alternator 46 has a rotating shaft 46a parallel to the crankshaft 32.

The balancer shafts 41, 42 are disposed closer to the cylinder head 34 than to the crankshaft 32. The camshaft 44 is sandwiched between the contact surfaces of the cylinder head 34 and the head cover 35.

The crankshaft 32, camshaft 44 and alternator 46 are aligned with each other in the front-and-rear direction of the outboard motor body 1A. The camshaft 44 and the alternator 46 are disposed on opposite sides of the crankshaft 32. The alternator 46 is located at a front portion of the engine room 24 which is opposite to the rear portion of the engine room 24 where the fresh air intake holes 22a, 22a are provided.

The crankshaft 32 has an upper end portion to which a camshaft drive pulley 47, a balancer shaft drive pulley 48 and an alternator drive pulley 49 are mounted in the order named as seem from below. The alternator drive pulley 49 has an upper end portion provided with a ventilating fan 51.

The camshaft 44 has an upper end portion to which a camshaft driven pulley 52 is mounted. A first endless belt 53 extends around the camshaft drive pulley 47 and the camshaft driven pulley 52.

Two balancer shaft driven pulleys 54, 54 are mounted to upper end portions of the balancer shaft 41 and intermediate shaft 43. A second endless belt 55 extends around the balancer shaft drive pulley 48 and the balancer shaft drive pulleys 54, 54.

An alternator driven pulley 56 is mounted to an upper end portion of the rotating shaft 46a of the alternator 46. A third endless belt extends around the alternator drive pulley 49 and the alternator driven pulley 56.

The crankcase 36 has an induction box (also called "intake silencer") 61 at a front end (left side in FIG. 2) thereof. The induction box 61 is connected to the combustion chambers 3a (FIG. 1) of the engine 3 through a throttle valve 62 and an intake manifold 63. The intake manifold 63 is arranged to extend along a right side surface (lower surface in FIG. 2) of the engine 3.

An electrical equipment box 64 is disposed in the engine room 24 at a position intermediately between the fresh air intake holes 22a, 22a and the alternator 46, and more specifically between a front edge L of a guide plate 74 (FIG. 3) and the alternator 46. The electrical equipment box 64 is attached to side surfaces (upper side in FIG. 2) of the cylinder block 33 (FIG. 1) and crankcase 36. The electrical equipment box 64 is compactly received in a narrow space defined between the cylinder block 33, the crankcase 36, and an inside surface of the engine cover 22.

The electrical equipment box 64 is an aluminum box having cooling fins and receives therein an electrical equipment 90 (FIG. 10) for controlling the engine 3. The electrical equipment 90 includes an electrical component 91 for a control system, and an ignition coil 92. The electric equipment 90 electrically controls the fuel injection quantity and fuel injection timing or the ignition timing.

A first tensioner 58 is provided to apply a predetermined tension to the first endless belt 53. Similarly, a second tensioner 59 applies a predetermined tension to the second endless belt 55. Reference characters A, B and C shown in FIG. 2 denote three vertical planes passing respectively through a center of the crankshaft 32, a center of the camshaft 44 and a center of the rotating shaft 46a of the alternator 46.

As shown in FIG. 3, a hollow belt cover or cover member 71 receives therein an upper portion of the alternator 46, and the first, second and third endless belts 53, 55, 57. The belt cover 71 is composed of an upper cover member 72 and a lower cover member 73. The upper cover member 72 has a multiplicity of air passage holes 72a in the form of vertical slits formed in a portion covering or surrounding the upper portion of the alternator 46. The lower cover member 73 has a recessed portion or opening 73a at a position corresponding to the alternator 46. The opening 73a faces a peripheral wall of the alternator 46.

The guide plate 74 is attached to the engine cover 22 and extends from lower edges of the fresh air intake holes 22, 22 toward the front end (right side in FIG. 3) of the engine cover 22. Fresh air drawn from the fresh air intake holes 22a, 22a flows forwardly along a space 24a defined between an upper wall of the engine cover 22 and the guide plate 74, as indicated by the arrows in FIG. 3. At the front edge of the guide plate 74 (which is located at a position indicated by the phantom line L shown in FIG. 2), the fresh air is introduced into the engine room 24. The front edge of the guide plate 74 thus forms a fresh air introducing portion or inlet of the engine room 24.

An engine hunger 75 is secured to the engine 3 and has an upper end extending vertically upwardly through the upper cover member 72 of the belt cover 71.

A fuel is supplied by fuel pumps 76, 76 from an external portion of the outboard motor 1 to a fuel sub-tank 77 and subsequently fed by a high-pressure fuel pump (not shown) through a high-pressure fuel filter 78 to the fuel injection valve 65 (FIG. 2). Reference numeral 79 shown in FIG. 3 denotes an oil filter.

Figure 4:
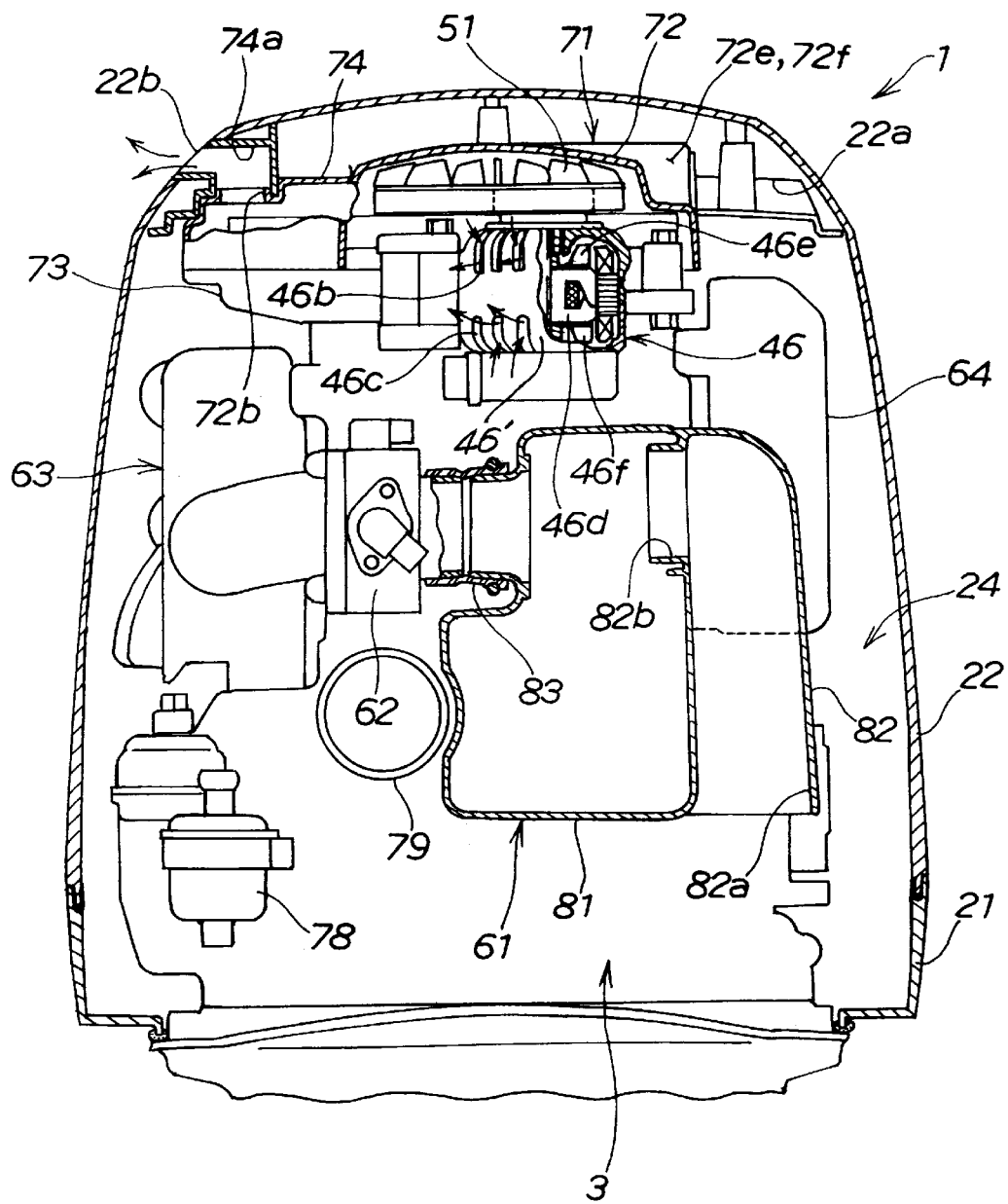

Referring now to FIG. 4, the alternator 46 includes a hollow casing 46' having a number of air passage holes 46b, 46b formed at each of upper and lower corners of the casing 46' in the form of slits. The alternator 46 has a plurality (two in the illustrated embodiment) of built-in cooling fans 46e, 46f attached to upper and lower end portions of a rotor 46d received in the casing 46'. When the rotor 46d rotates together with the rotating shaft 46a of the alternator 46, the cooling fans 46e, 46f rotate. With this rotation of the cooling fans 46e, 46f, the fresh air is drawn from an upper portion of the upper air passage holes 46b into the casing 46', so that the interior of the alternator 46 is cooled by the fresh air. The fresh air is subsequently driven out from the casing 46' through the lower air passage holes 46c.

The induction box 61 is comprised of a box-shaped body portion 81 and a duct portion 82 connected to a side surface (right side in FIG. 4) of the body portion 81. The induction box 61 is disposed below the alternator 46. The duct portion 82 has, at its lower end, an inlet 82a which opens downwards and, at its upper end, a connecting hole 82b communicating with an internal space of the body portion 81.

According to one feature of the invention, the inlet 82a of the induction box 61 communicating with the combustion chambers 3a (FIG. 1) of the engine 3 is located near the alternator 46. In FIG. 4 reference numeral 83 denotes a flexible intake duct.

The induction box 61, the throttle valve 62, the intake manifold 63 and the flexible intake duct 83 constitute an air intake device communicated with the combustion chambers 3a of the engine 3.

As described above, the vertical multicylinder engine 3 is equipped with an engine block (which is an assembly composed of the cylinder block 33, cylinder head 34, head cover 35 and crankcase 36), the air intake device, the alternator 46 and the electrical equipment box 64.

The guide plate 74 has at its right side portion (left side in FIG. 4) a ventilating duct 74a. The ventilating duct 74a extends between a vent hole 72b of the upper cover member 72 and the vent hole 22b of the engine cover 22.

As the ventilating fan 51 rotates for ventilating the interior of the belt cover 71, the stale air which is engaged in the cooling of the alternator 46 is discharged from the engine room 24 to the outside of the outboard motor 1 through the ventilating duct 74a. With this ventilation, the stale air inside the belt cover 71 is replaced by fresh air through the ventilating duct 74a.

Referring back to FIG. 2, the upper cover member 72 interiorly has a plate-like guide wall 72c disposed between the alternator drive pulley 49 and the alternator driven pulley 56 for guiding the stale air toward the vent hole 72b, and a plate-like guide wall 72d extending along the second endless belt 55 trained around the intermediate shaft drive pulley 54 for guiding the stale air to the vent hole 72b.

The upper cover member 72 further has a pair of parallel spaced guide walls 72e, 72f (indicated by phantom lines) formed integrally with an upper surface of the upper cover member 72, so that the fresh air drawn from the fresh air intake holes 22a, is branched by the guide walls 72e, 72f and partly guided toward the electrical equipment box 64 as it flows along the upper surface of the upper cover member 72.

The lower cover member 73 has a bottom wall 73b formed with a plurality of air passage hole groups which include a multiplicity of first air passage holes (intake holes) 73c formed in an area adjacent to the crankshaft 32, a multiplicity of second air passage holes (intake holes) 73d formed in an area adjacent to the camshaft 44, and a plurality (two in the illustrated embodiment) of third air passage holes (intake holes) 73e formed in an area adjacent to the electrical equipment box 64. All of the air passages holes (intake holes) 73c, 73d, 73e are in the form of parallel slits.

The first and second air passage holes 73c, 73d serve to vent or release hot air heated by the engine 3 disposed blow the belt cover 71. The third air passage holes 73e are vent holes provided to protect the electrical equipment box 64 from being filled with hot air.

Reference is made to FIG. 5 which shows the upper cover member 72 in plan view. As shown in this figure, the upper cover member 72 has the air passage holes 72a, the vent hole 72b, and the two guide walls 72c, 72f. The guide walls 72e, 72f extend from a right side edge of the upper surface of the upper cover member 72 (which is located adjacent to the electrical equipment box 64) in a transverse direction of the upper cover member 72. The upper cover member 72 also has an opening 72g through which the engine hunger 75 extends upwardly.

FIG. 6A is a cross-sectional view corresponding to FIG. 5, and FIG. 6B is a cross-sectional view taken along line 6B—6B of FIG. 6A. As shown in FIGS. 6A and 6B, additional to the air passage holes 72a, the vent hole 72b, and the guide walls 72c, 72d, the upper cover member 72 further has a guide wall 72h disposed in diametrically opposed relation to the guide wall 72c about a center of the ventilating fan 51 indicated by the phantom lines. The guide walls 72c, 72d, 72h depend from the inside surface of an upper wall of the upper cover member 72.

FIG. 7A is a view in the direction of arrow 7A in FIG. 5, and FIG. 7B is a view in the direction of arrow 7B in FIG. 7A. In FIGS. 7A and 7B, the shape of and the positional relationship between the guide walls 72e, 72f are shown.

Reference is made to FIGS. 8A and 8B which are a plan view of the lower cover member 73 and a cross-sectional view taken along line 8B—8B of 8A, respectively. As shown in FIGS. 8A and 8B, the opening 73a is formed in a front end portion of the lower cover member 73 (which is located close to the alternator 46 indicated by the phantom lines in FIG. 8A). The first, second and third air passage holes 73c, 73d, 73e are formed in the bottom wall 73b of the lower cover member 73.

The outboard motor 1 of the foregoing construction operates as follows.

When the engine 3 shown in FIG. 2 is started, the crankshaft 2 rotates whereupon the camshaft drive pulley 47, the balancer shaft drive pulley 48 and the alternator drive pulley 49 rotate together with the crankshaft 2. Rotation of the drive pulleys 47, 48, 49 is transmitted by the first, second and third endless belts 53, 55, 57 to the camshaft driven pulley 52, the balancer shaft driven pulley 54, and the alternator driven pulley 56 whereby the camshaft 44, the intermediate shaft 43, the balancer shaft 41, the balancer shaft 42 interlocked with the intermediate shaft 43, and the alternator 46 are driven or rotated.

While the engine 1 is running, cooling operation is achieved in a manner as will be described below with reference to FIGS. 9 and 10.

Intake vacuum or suction produced during operation of the engine 3 develops a negative pressure inside the engine room 24. Fresh air is, therefore, drawn from the fresh air intake holes 22a (one being diagrammatically shown in FIG. 9) into the engine cover 22 and then guided toward the engine room 24 along an upper surface of the guide plate 74, as indicated by the arrows shown in FIG. 9. By virtue of a diagonal arrangement of the fresh air intake holes 22a and the inlet 82a of the induction box 61 within the engine room 24 (i.e., the fresh air intake holes 22a are located at a rear upper end portion of the engine room 24 while the inlet 82a of the induction box 61 is located at a front lower end portion of the engine room 24), the fresh air flows through substantially the entire area of the engine room 24 while bypassing the peripheral wall of the engine 3 and subsequently is taken into the induction box 61 through the inlet 82a. The fresh air drawn into the induction box 61 is supplied to each cylinder 31 (FIG. 1) of the engine 3.

Because of the alternator 46 disposed forwardly of the crankcase 36 (FIG. 1) which is located in a front end portion of the engine room 24, the fresh air flows forwards along the upper wall of the engine cover 22. In addition, since the alternator 46 is disposed in a path along which the fresh air flows downward along a front wall of the engine cover 22, the alternator 46 acting as a heat generating element and its surrounding parts or components can be effectively cooled down.

A part of the fresh air which is not taken into the induction box 61 from the engine room 24 is drawn into the belt cover 71 through the air passage holes 72a formed in the upper cover member 72 and through the opening 73a and the first, second and third air passage holes 73c, 73d, 73e formed in the lower cover member 73. In the belt cover 71, the fresh air part is stirred by the ventilating fan 51 provided on the alternator drive pulley 56, so that the first, second and third endless belts 53, 55, 57 are cooled by this fresh air part. Thereafter, the fresh air is exhausted from the belt cover 71 to the outside of the outboard motor 1 through the ventilating duct. At this time, the alternator 46 and its surrounding parts are further cooled by the fresh air flowing out from the belt cover 71 through the opening 73a because the opening 73a surrounds the alternator 46.

As shown in FIG. 10, the fresh air drawn from the fresh air intake holes 22 into the engine room 24 along the upper surface of the guide plate 74 flows along the upper surface of the upper cover member 72 during which time the fresh air is branched by the guide walls 72e, 72f and partially guided into the electrical equipment box 64.

Various operations achieved by the fresh air are as follows.

A part of fresh air (first fresh air part) taken into the engine room 24 flows around the electrical equipment box 64 and then is drawn into the air intake device of the engine 3 through the inlet 82a of the induction box 61. Thus, the electric equipment 90 (including the electrical component 91 for the control system and the ignition coil 92 that are received in the aluminum case with cooling fins) is cooled by the first fresh air part. The first fresh air part is subsequently supplied to the engine 3 for combustion and finally exhausted from the vent hole 22b (FIG. 4) to the outside of the outboard motor 1. By virtue of the air passage holes 64a provided in the electrical equipment box 64, the fresh air is permitted to flow into the electrical equipment box 64 through the air passage holes 64a, so that the electrical equipment 90 received in the electrical equipment box 64 is cooled.

Another part of the fresh air (second fresh air part), after passing through the vicinity of the electrical equipment box 64, is drawn into the interior of the alternator 46 through the air passage holes 46b, 46c (FIG. 4) formed in the casing 46' (FIG. 4). Thus, the second fresh air part is engaged first in the cooling of the electrical equipment 90 and subsequently in the cooling of the alternator 46. Thereafter, the second fresh air part is either exhausted from the ventilating duct 74a (FIG. 4) of the belt cover 71, or alternatively taken into the air intake device through the inlet 82a for combustion. In the latter case, the second fresh air part is finally discharged from the vent hole 22b (FIG. 4).

Still another part of the fresh air (third fresh air part) flows directly from the fresh air intake holes 22a to the alternator 46 for cooling the alternator 46. More specifically, by virtue of the built-in cooling fans 46e, 46f of the alternator 46, the third fresh air part taken from the fresh air intake holes 22a into the engine room 24 is positively drawn into the belt cover 71 through the air passage holes 72a in the upper cover member 72 under drawing and discharging actions produced while the cooling fans 46e, 46f are rotating in unison with the rotor 46d (FIG. 4) of the alternator 46. The alternator 46 is, therefore, cooled at high efficiency.

Another part of the fresh air (fourth fresh air part) is directly drawn into the air intake device though the inlet 82a and then supplied to the engine 3 for combustion.

As described above, fresh air is taken into the engine room 24 through the fresh air intake holes 22a formed in the engine cover 22. The fresh air is used for cooling the alternator 46. The alternator 46 is further cooled by a part of the fresh air when the fresh air part is discharged from the engine room 25 to the outside of the outboard motor 1 through the internal space of the belt cover 71. With this cooling, it becomes possible to considerably lessen or reduce the influence of heat exerted from the alternator 46 on the surrounding components, such as the first, second and third endless belts 53, 55, 57.

When the engine 3 is stopped, hot air heated by the engine 3 enters the belt cover 71 through the air passage holes 72a in the upper cover member 72 and through the opening 73a and the first, second and third air passage holes 73c, 73d, 73e in the lower cover member 73 and finally is discharged from the outboard motor 1 through the ventilating duct 74a shown in FIG. 9.

Obviously, various minor changes and modifications of the present invention are possible in the light of the above teaching. It is therefore to be understood that within the scope of the appended claims the invention may be practiced otherwise than as specifically described.

What is claimed is:

1. An outboard motor comprising: an engine cover defining an engine room and having an air intake hole for taking air into the engine room and a vent hole for exhausting the air after it circulates in the engine room to cool the interior of the engine room; an engine block having a crankshaft rotatably supported in a vertical position within the engine room; a drive pulley mounted to an upper end portion of the crankshaft; an alternator having a driven pulley connected in driven relation to the drive pulley via an endless belt extending around the drive and driven pulleys and having a plurality of cooling fans for taking air into the interior of the alternator to cool the alternator; a belt cover disposed in the engine room and covering the drive and driven pulleys, the endless belt and at least an upper portion of the alternator, the belt cover having a vent hole communicating with the vent hole of the engine cover, an upper wall, a side wall extending downward from the upper wall and having a portion surrounding at least the upper portion of the alternator, and a plurality of first air passage holes formed in the side wall portion for introducing air therethrough into the belt cover such that the alternator is cooled by the air as the air flows alongside the alternator before it is discharged from the vent hole of the belt cover; and an electric equipment box disposed in the engine room at a position intermediate the air intake hole of the engine cover and the alternator; wherein the belt cover has a pair of parallel spaced guide walls formed integrally with an upper surface of the upper wall of the belt cover for guiding air toward the electric equipment box.

2. An outboard motor according to claim 1; wherein the belt cover has a plurality of second air passage holes formed in a portion of the belt cover adjacent to the electric equipment box.

3. An outboard motor comprising: an engine cover defining an engine room and having an air intake hole for taking air into the engine room and a vent hole for exhausting the air after it circulates in the engine room to cool the interior of the engine room; an engine block having a crankshaft rotatably supported in a vertical position within the engine room; a drive pulley mounted to an upper end portion of the crankshaft; an alternator having a driven pulley connected in driven relation to the drive pulley via an endless belt extending around the drive and driven pulleys and having a plurality of cooling fans for taking air into the interior of the alternator to cool the alternator; and a belt cover disposed in the engine room and covering the drive and driven pulleys, the endless belt and at least an upper portion of the alternator, the belt cover having a vent hole communicating with the vent hole of the engine cover, an upper wall, a side wall extending downward from the upper wall and having a portion surrounding at least the upper portion of the alternator, and a plurality of first air passage holes formed in the side wall portion for introducing air therethrough into the belt cover such that the alternator is cooled by the air as the air flows alongside the alternator before it is discharged from the vent hole of the belt cover; wherein the belt cover comprises an upper cover member and a lower cover member connected to the upper cover member, the upper cover member having an upper wall and a side wall extending downward from the upper wall, the upper and side walls of the upper cover member forming the upper and the side walls of the belt cover, respectively, the lower cover member having a bottom wall and a side wall extending upwardly from the bottom wall, the side wall of the lower cover member having a portion partly defining an opening extending along the periphery of the alternator.

4. An outboard motor according to claim 3; further comprising a ventilating fan mounted to the upper portion of the crankshaft for ventilating the interior of the belt cover; and wherein the belt cover has a first internal guide wall formed integrally with the upper wall of the upper cover member and disposed at a position between the drive pulley and the driven pulley for guiding air inside the belt cover toward the vent hole of the belt cover in such a way so as to bypass the endless belt.

5. An outboard motor according to claim 4; wherein the belt cover has a second internal guide wall formed integrally with the upper wall of the upper cover member and extending along another portion of the side wall of the upper cover member, the internal guide wall having a first end located near the ventilating fan and a second end opposite the first end located adjacent to the vent hole of the belt cover.

6. An outboard motor according to claim 5; wherein the belt cover has a third internal guide wall formed integrally with the upper wall of the upper cover member and disposed in a diametrically opposite relation to the first internal guide wall with respect to a rotational axis of the drive pulley.

7. An outboard motor according to claim 3; further comprising an electric equipment box disposed in the engine room at a position intermediate the intake hole of the engine cover and the alternator; wherein the belt cover has a pair of parallel spaced guide walls formed integrally with an upper surface of the upper wall of the belt cover for guiding air toward the electric equipment box.

8. An outboard motor according to claim 7; wherein the bottom wall of the lower cover member has a plurality of second air passage holes formed therethrough in a portion of the lower cover member adjacent to the electric equipment box.

9. An outboard motor according to claim 3; wherein the first air passage holes comprise a plurality of parallel vertical slits.

10. An outboard motor according to claim 3; wherein the bottom wall of the lower cover member has a plurality of second air passage holes formed therethrough at a portion located adjacent to the side wall portion defining the opening.

11. An outboard motor according to claim 10; wherein the second air passage holes comprise a plurality of parallel slits.

12. An outboard motor according to claim 3; wherein the bottom wall of the lower cover member has a plurality of air passage holes formed therethrough at an end position located remote from the side wall portion defining the opening.

13. An outboard motor according to claim 12; wherein the air passage holes comprise parallel slits.

14. An outboard motor comprising: a first case member and a second case member connected to the first case member to form an enclosure having an inner space, the first case member having an air intake hole for taking air into the inner space and a vent hole for exhausting the air after it circulates in the inner space to cool the interior of the inner space; an engine having a crankshaft and being mounted within the inner space of the enclosure; an alternator disposed in the inner space of the enclosure and having a hollow casing, a plurality of air passage holes in the hollow casing, and a plurality of cooling fans for drawing air from the air passage holes into the hollow casing to cool the alternator; a cover member disposed in the inner space of the enclosure and covering at least a portion of the alternator, the cover member having a vent hole communicating with the vent hole of the first case member, an upper wall, a side wall extending from the upper wall and surrounding the portion of the alternator, and a plurality of first air passage holes formed in the side wall for introducing air therethrough into the cover member and through the air passage holes of the alternator hollow casing to cool the alternator before the air is discharged from the vent hole of the cover member; and an electric equipment box disposed in the inner space of the enclosure and between the air intake hole of the first case member and the alternator; wherein the cover member has a pair of spaced guide walls formed integrally with the upper wall for guiding air toward the electric equipment box.

* * * * *